United States Patent [19]

Maruyama et al.

[11] Patent Number: 4,815,944
[45] Date of Patent: Mar. 28, 1989

[54] VARIABLE CAPACITY COMPRESSOR

[75] Inventors: Teruo Maruyama; Yoshikazu Abe, both of Hirakata; Tatuhisa Taguti, Katano, all of Japan

[73] Assignee: Matsushita Electric Industrial Co., Ltd., Kadoma, Japan

[21] Appl. No.: 158,174

[22] Filed: Feb. 19, 1988

[30] Foreign Application Priority Data

Feb. 20, 1987 [JP] Japan ................................ 62-38456

[51] Int. Cl.⁴ ...................... F04B 49/02; F04C 29/08
[52] U.S. Cl. .................................. 417/295; 417/310
[58] Field of Search ...................... 417/295, 310, 440; 418/15

[56] References Cited

U.S. PATENT DOCUMENTS 4,557,670 12/1985 Inagadi et al. ...................... 417/310
4,744,732  5/1988 Wakajima et al. .................... 418/15

FOREIGN PATENT DOCUMENTS 128487  8/1983 Japan ................................ 417/310
  195001 11/1983 Japan ................................ 417/440
58-211591 12/1983 Japan .
    1887  1/1986 Japan ................................ 417/300
  232397 10/1986 Japan ................................ 418/159

Primary Examiner—William L. Freeh
Attorney, Agent, or Firm—Cushman, Darby & Cushman

[57] ABSTRACT

In a variable capacity compressor having a capacity control mechanism so as to keep a suction pressure constant by detecting the suction pressure, plural return ports (18), a return passage (10) and an exit (19) are provided for bypassing refrigerant gas from a volume-decrease-step space in a cylinder compartment (5a) to a volume-increase-step space in that, and a guide passage (8) wherein a slider slides by a pressure of refrigerant gas is provided for controlling an amount of bypassing gas; and thereby it is possible to control capacity correctly and stably.

9 Claims, 5 Drawing Sheets

VARIABLE CAPACITY COMPRESSOR

FIELD OF THE INVNETION AND RELATED ART STATEMENT

1. FIELD OF THE INVENTION

The present invention relates to a compressor which is applicable, for instance, for an air conditioner of a car, and more particularly relates to an improvement in a variable capacity compressor.

2. DESCRIPTION OF THE RELATED ART

Recently, improvement in a compressor which is used for an air conditioner of a car has been directed to development of a variable capacity compressor for enabling saving power and improving comforts. In 1986, a rotary type compressor, which is superior to a reciprocation type compressor in respects of compactness and silence and is possible to control capacity by providing of a by-pass cylinder, was put on market by Nippon Denso Co., LTD. A basic structure of control mechanism of the compressor is shown in FIG. 5. In the figure, a spool valve 42, which is cylinder-shaped and is slidably disposed inside an enclosure 40 having a cylindrical inner wall 41 therein, is urged by a spring 43 in a direction making two by-pass holes 44, which are provided in the enclosure 40 and connected to a high pressure compartment of a cylinder (not shown), open. Refrigerant gas is fed from a suction compartment 45, which is provided adjacently and connected next to the enclosure 40, to the cylinder. And the gas exhausted out of the cylinder comes in the enclosure 40 through the by-pass holes 44 and returns to the suction compartment 45. Pressure in a pressure control compartment 46, which is at the part above the spool valve 42 and is applied with a near exhaust pressure 50 of the cylinder, is adjusted by automatical controlling opening of a valve 48 in a pressure regulator 47 by means of pressure difference between the pressure of the suction compartment 45 and the atmospheric pressure 49, so as to keep pressure of the suction compartment 45 constant. Thus, opening of the by-pass holes 44 is automatically adjusted, hence to control amount of outflowing of the gas into the suction compartment 45.

The above-mentioned conventional variable capacity compressor has the following shortcomings.

Firstly, in the above-mentioned structure, since the spool valve 42 reciprocates on a straight line, freedom of arrangement of the by-pass holes 44 around a cylinder or a cylinder compartment having circular crosssection and a cross-sectional area of a passage of the bypass holes 44 are restricted. In fact, variable range of capacity of the compressor of this type is not sufficiently wide (i.e. it is about 50–100 percent of cooling capacity).

Secondly, when a large cooling capacity is required, the spool valve 42 is pushed with a high pressure, and thereby the by-pass holes 44 are closed. In such state, since the pressure regulator 47 always applies a high pressure, which is near to an exhaust pressure, to the pressure control compartment 46, the gas is likely to leak to the suction compartment 45 through a circumference of the spool valve 42. Thereby the cooling capacity is decreased.

Thirdly, since the spring 43 is frequently repeated to expand and contract, the spring 43 becomes to have a metal fatigue in itself after a long time use thereof. As a result, a characteristic of the spring 43 becomes worse, and thereby it becomes impossible to control the spool valve 42 correctly.

OBJECT AND SUMMARY OF THE INVENTION

The object of the present invention is to provide a variable capacity rotary compressor which is capable of having a wide variable capacity range and a stable characteristic for correctly controlling capacity.

The variable capacity compressor in accordance with the present invention comprises:

a rotor;

an enclosure containing the rotor rotatably therein and having a cylinder compartment wherein a volume sectioned by the rotor is changed cyclically by rotation of the rotor, a plurality of return port formed on a wall of volume-decrease-step space in the cylinder compartment, a return passage which connects to the cylinder compartment through the return port, an exit formed on the wall of volume-increase-step space in the cylinder compartment for connecting the return passage with the cylinder compartment, and a guide passage which has a first orifice for leading control pressure on an end thereof, a second orifice for leading high pressure on the other end thereof, a third orifice for leading suction pressure on an intermediate part thereof and an aperture for connection to the return passage;

a slider which slides gas-tightly in the guide passage with a first compartment for leading the control pressure and a second compartment for leading the high pressure remaining in both end parts of the guide passage and has a cut-off part (20a) thereon for making a narrow passage connecting the second compartment to the third orifice with a variable fluid friction between the slider and the guide passage and has an aperture thereon for opening the return port; and a pressure control means for adjustably supplying the control pressure to the first compartment.

The above-mentioned variable capacity compressor has the following advantage.

The second compartment operates like a spring, but has no change of characteristic of expansion and contraction after a long time use thereof. Therefore, it is possible to control the capacity correctly and stably without any change of characteristic for long service time.

DESCRIPTION OF THE PREFERRED EMBODIMENTS

Figure 1:
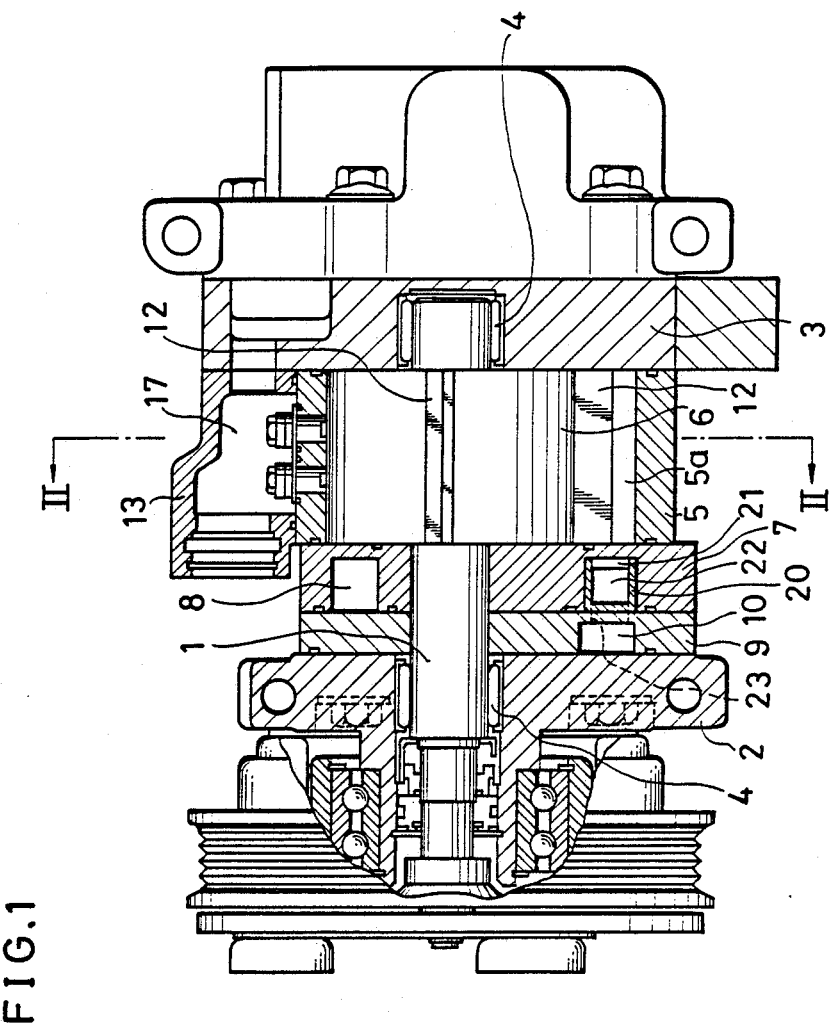
FIG. 1 is a cross-sectional view showing an embodiment of a variable capacity compressor of the present invention.
Figure 2:
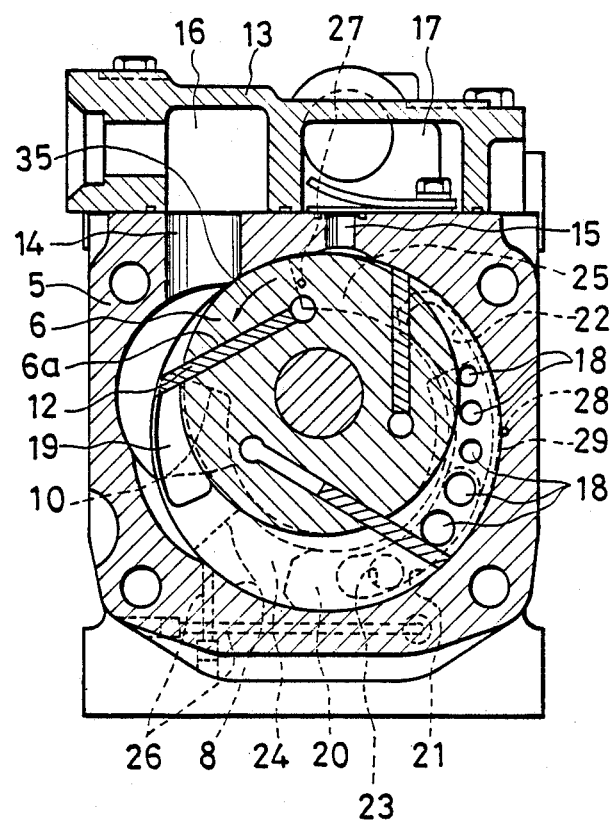
FIG. 2 is a cross-sectional view taken on line II—II in FIG. 1

Hereafter, preferred embodiment of the present invention is described with reference to the accompanying drawings. FIG. 1 shows a cross-sectional view of an embodiment of a variable capacity compressor. FIG. 2 is a cross-sectional view taken on line II—II in FIG. 1.

Figure 3:
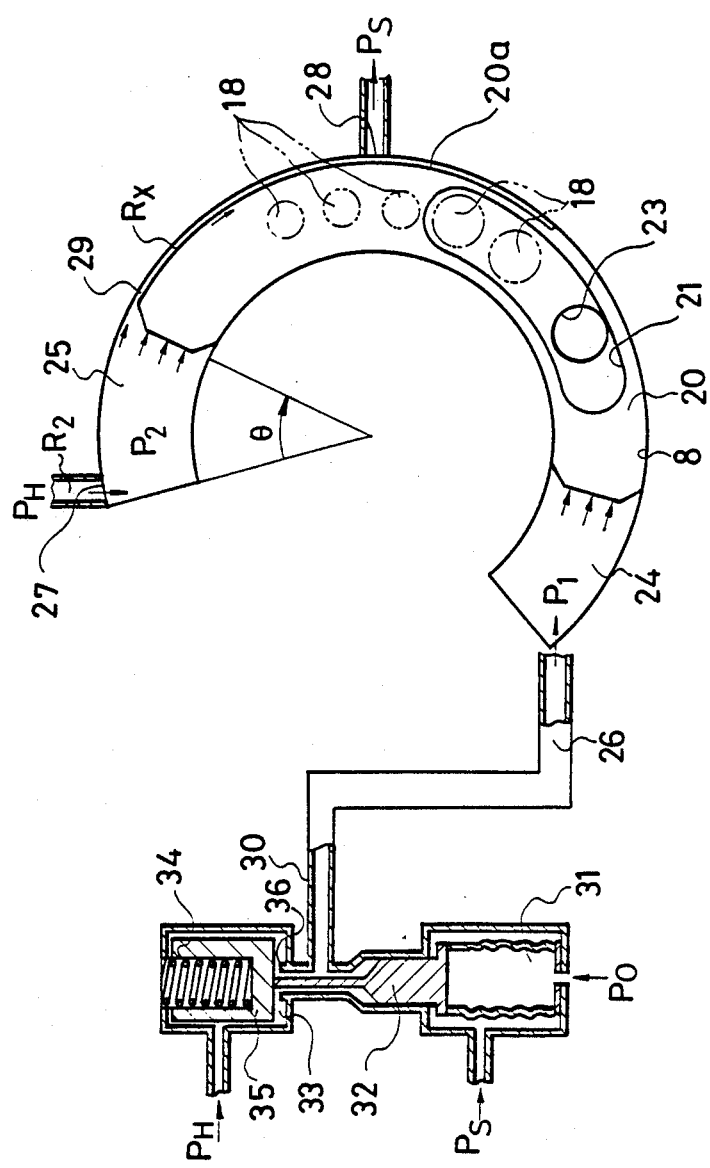
FIG. 3 is a schematic illustration showing control mechanism of an embodiment of a variable capacity compressor of the present invention.

FIG. 3 is a schematic illustration showing control mechanism of a variable capacity compressor of the present invention. In FIG. 1, a shaft 1 is held by pin-roller bearings 4 which are provided in a front plate 2 and a rear plate 3. A rotor 6 which is shrunk on the shaft 1 rotates in a direction shown by an arrow 35 (FIG. 2) in a cylinder 5. A first intermediate plate 7 having an arc-shaped guide passage 8 (FIG. 1, 2) therein and a second intermediate plate 9 having an arc-shaped return passage 10 are put between the cylinder 5 and the front plate 2. In FIG. 2, vanes 12 are inserted to be slidably held in plural slits 6a which are formed in the rotor 6 in radial directions. A cylinder-head cover 13 has a suction compartment 16 and an exhaust compartment 17 therein for connection to a suction inlet 14 and an exhaust outlet 15, which are formed in the cylinder 5, respectively. Plural return ports 18 are formed on the first intermediate plate 7 so as to connect a volume-decrease-step space, which is a space sectioned by the vanes 12 in a cylinder compartment 5a and is to be decreased by rotation of the rotor 6, to the guide passage 8. As shown in FIG. 2, the return ports 18 are disposed in an arc-shaped arrangement in such manner that diameters thereof decrease one by one in the rotating direction 35 of the rotor 6. The ratio of compression increases responding to the rotation of the rotor 6, and thereby amount of reexpansion of high pressure refrigerant gas increases. Therefore, the above-mentioned manner of arrangement is desirable to get high cooling efficiency for the compressor. An exit 19 is formed through the first intermediate plate 7 and the second intermediate plate 9 so as to connect the return passage 10 formed in the second intermediate plate 9 with a volume-increase-step sapce of the cylinder compartment 5a. A slider 20 is provided slidably and gas-tightly in the guide passage 8. The slider 20 has a surface contacting on the return ports 18 for closing them and an arc-shaped aperture 21 formed in that surface for making through-path thereto. The arc-shaped aperture 21 is connected to the return passage 10 through a passage 22 formed in the slider 20 and a vent 23 formed in the second intermediate plate 9. And the passage 22 and the vent 23 are formed to connect each other at any position of the slider in the guide passage 8. When the slider 20 is positioned at a counter-rotating-directional end of the rotor 6 (namely a clockwise end of FIG. 2) in the guide passage 8, all of the return ports 18 are closed by the slider 20. When the slider 20 is positioned at a rotating-directional end of the rotor 6 (namely an anti-clockwise end of FIG. 2) in the guide passage 8, all of the return ports 18 are open by the aperture 21 of the slider 20. In the guide passage 8, a first pressure compartment 24 is formed between the clockwise end of the guide passage 8 and the slider 20, and a second pressure compartment 25 is formed between the anticlockwise end of the guide passage 8 and the slider 20. As shown in FIG. 3, control pressure is applied to the first pressure compartment 24 from a pressure controller 30 via a pressure lead-in pipe 26. Further, high pressure $P_H$ is applied to the second pressure compartment 25 from a high pressure lead-in orifice 27. A suction pressure lead-in orifice 28 is provided at a center part of an external circumference of the guide passage 8, and a variable-length passage 29, which connects the suction pressure lead-in orifice 28 to the second pressure compartment 25 with a very small cross-sectional area thereof, is formed between a circumference of a cut-off part 20a of the slider 20 and the guide passage 8. When the slider 20 moves in the guide passage 8, an effective length of the variable-length passage 29 varies between the second pressure compartment 25 and the suction pressure lead-in orifice 28, thereby to vary a fluid friction $R_X$ which is determined by the effective length of the passage 29. The pressure controller 30 comprises a bellows 31, a valve spring 34, a valve 35, a valve bank 36 and a rod 32 which is fixed to the bellows 31. The bellows 31 expands/shrinks by a differential pressure between the suction pressure $P_S$ and the atmospheric pressure $P_O$, and thereby the rod 32 pushes/releases the valve 35 which is energized to push the valve bank 36. Control pressure which is exhausted out of the pressure controller 30 is led to the first pressure compartment 24 through the pressure lead-in pipe 26.

Next, operations of the above-mentioned variable capacity compressor is described.

As for the air conditioner (not shown) of the car, the compressor is generally rotated by the engine via a belt or the like means. Therefore, when temperatures outside/inside the car are kept constant, cooling capacity and input characteristic of the air conditioner comprising a fixed displacement compressor shows a tendency that the suction pressure gradually decreases and the cooling capacity gradually increases responding to increase of rotation speed of the compressor. And, power consumption of the engine increases substantially in proportion to the rotation speed of the compressor. Therefore, coefficient of capacity showing efficiency of cooling capacity per the power consumption of the engine decreases responding to increase of the rotation speed. This embodiment is to keep the suction pressure so as not to drop below the predetermined value irrespective of increase of the rotation speed above the predetermined valve, thereby to restrain increases of the cooling capacity and the power consumption.

In the first pressure compartment 24, the control pressure $P_1$ is supplied from the pressure controller 30 via the pressure lead-in pipe 26. In the second pressure compartment 25, the high presure $P_H$ is supplied from the high pressure lead-in orifice 27 with a fluid friction $R_2$, and the suction pressure $P_S$ is led through the variable-length passage 29 which has an effective length responding to a position of the slider 20. The slider 20 comes to a standstill at a position where the pressure $P_1$ of the first pressure compartment 24 becomes equal to the pressure $P_2$ of the second pressure compartment 25. When the rotation speed of the compressor is not so high, the pressures $P_1$ is low and nearly equal to the suction pressure $P_S$. At that time, the slider 20 comes to the stable position where a capacity of the first pressure compartment 24 is made minimum and that of the second pressure compartment 25 is made maximum, thereby to decrease the pressure $P_2$ into the pressure nearly equal to the suction pressure $P_S$. Such position is shown by a maximum angle of $\theta(75°$ in FIG. 4) in FIG. 3. Under this state, the aperture 21 of the slider 20 does not come on any return ports 18, and thereby the return ports 18 are closed by the slider 20. After that, in the pressure controller 30, when the suction pressure $P_S$ decreases below a predetermined value by increasing of the rotation speed, the bellows 31 expands. And thereby, the rod 32 pushes the valve 35 against the valve spring 34, so that a gap 33 is made between the valve 35 and the valve bank 36. Then, the high pressure Pis applied through the gap 33, and thereby the control pressure increases. As a result, the pressure $P_1$ in the first pressure compartment 24 increases, so that the slider 20 moves in the rotating direction of the rotor 6 (anticlockwise of the figure) against the pressure $P_2$ in the second pressure compartment 25. Then, the effective length of the variable length passage 29 is lengthened, hence increasing the fluid friction $R_X$, and thereby the pressure $P_2$ in the second pressure compartment 25 increases. And again, the slider 20 gets a stable position where the pressure $P_1$ becomes equal to the pressure $P_2$. Under that position, some return ports 18 are open by facing the aperture 21. And thereby, high pressure refrigerant gas bypasses through the return ports 18, the aperture 21, the passage 22, the vent 23, the return passage 10 and the exit 19 in this order, and returns to the volume-increase-step space of the cylinder compartment 5a. Thus, amount of the gas which is exhausted out of the compressor decreases as a result of the bypassing through the exit 19, and thereby pressure balance between the suction pressure $P_S$ and the exhaust pressure in refrigeraing cycle is changed, and hence the suction pressure $P_S$ increases. When the suction pressure increases over the predetermined valve, the gap 33 between the valve 35 and the valve bank 36 is made small, and thereby the control pressure $P_1$ of the first pressure compartment 24 decreases. Thereby, the slider 20 slides clockwise by the pressure $P_2$ of the second pressure compartment 25. The above-mentioned operation of the slider 20 is repeated until the suction pressure $P_S$ becomes equal to the predetermined value, and the slider 20 gets a stable position, though negligibly slight trembles may arise.

Figure 4:
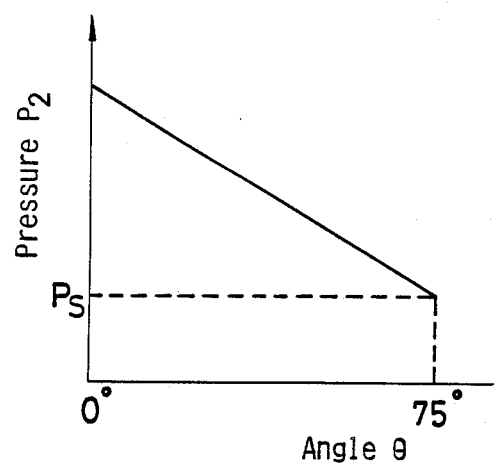
FIG. 4 is a graph showing a relation between pressure $P_2$ and angle $\theta$ of a slider in accordance with the present invention.
Figure 5:
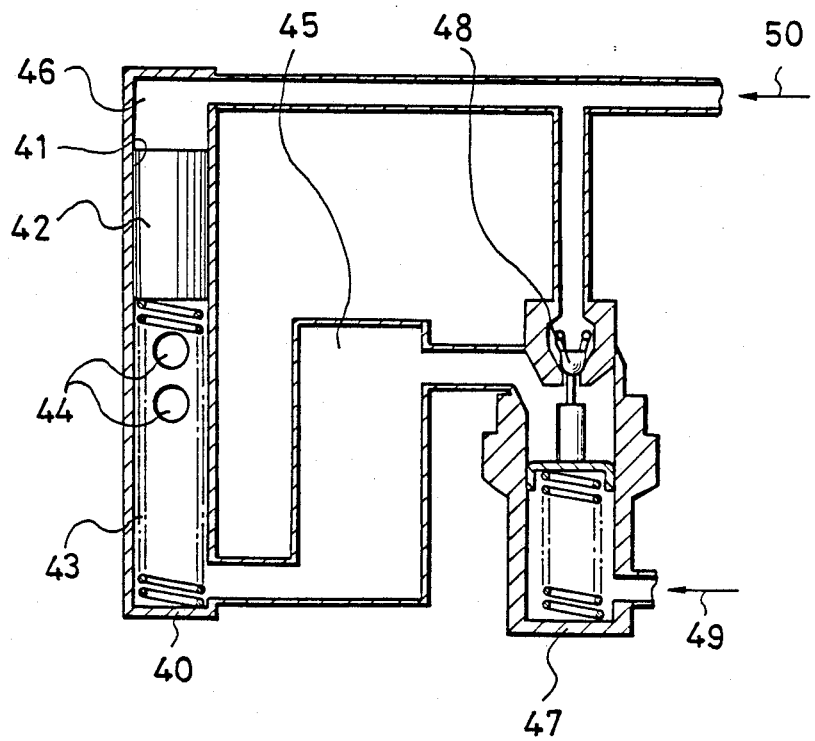
FIG. 5 is the basic structural view of the conventional variable capacity compressor.

As shown in FIG. 4, a relation of the pressure $P_2$ of the second pressure compartment 24 versus the angle $\theta$ (FIG. 3) between the anticlockwise end of the guide passage 8 and the anticlockwise end of the slider 20 is linear accompanying a gradient determined by the fluid frictions $R_2$ (FIG. 3) and $R_X$ (FIG. 3). In FIG. 3, a compression spring (not shown) having an equivalent characteristic shown in FIG. 4 is applicable in the second pressure compartment 25 instead of leading the high pressure $P_H$. However, in such case friction occurs between the spring and the inner wall of the second pressure compartment 25 by contacting of the spring and the wall with a pressure of spring. And thereby, the spring becomes to have a hysteresis, thereby resulting in such an undesirable state that the slider 20 cannot be controlled correctly. Moreover, there is such problem that the characteristic of the spring changes by abrasion and metal fatigue thereof. Using the second pressure compartment in place of a spring eliminates problems induced by the above-mentioned hysteresis and the change of characteristic.

In the above-mentioned embodiment, since the slider 20 slides in the arc-shaped guide passage 8, an arrangement range of the return ports 18 and a crosssectional area of the return ports 18 can be made wide, and thereby a range of variable capacity can be made wide in comparison with the conventional linear guide passage wherein the slider reciprocates on the straight line. For instance, variable range of capacity is from 15 to 100 percent according to this embodiment.

Further, since the pressure $P_1$ of the first pressure compartment 24 and the pressure $P_2$ of the second pressure compartment 25 are both low at the maximum-capacity driving time when all of the return ports 18 are closed by the slider 20, leakage of the gas is avoidable. Therefore, a high efficiency compressor can be offered.

In the above-mentioned embodiment, though the variable capacity compressor having the arc-shaped guide passage 8 and the slider 20 was shown, it is also possible to apply this invention to the type of variable capacity compressor wherein the slider reciprocates on the straight line.

Although the above-mentioned embodiments of the present invention are for the rotary compressor of sliding vane type, the present invention are also applicable to that of ellipse-shaped cylinder type and that of through-slot vane type, and the application can be expanded to a rolling piston type compressor and a scroll type compressor.

While specific embodiments of the invention have been illustrated and decribed herein, it is realized that other modifications and changes will occur to those skilled in the art. It is therefore to be understood that the appended claims are intended to cover all modifications and changes as fall within the true spirit and scope of the invention.

What is claimed is

1. A variable capacity compressor comprising:
a rotor;
an enclosure containing said rotor rotatably therein and having a cylinder compartment wherein a volume sectioned by said rotor is changed cyclically by rotation of said rotor, a plurality of return ports formed on a wall of volume-decrease-step space in said cylinder compartment, a return passage which connects to said cylinder compartment through said return ports, an exit formed on said wall of volume-increase-step space in said cylinder compartment for connecting said return passage with said cylinder compartment, and a guide passage which has a first orifice for leading control pressure on an end thereof, a second orifice for leading high pressure on the other end thereof, a third orifice for leading suction pressure on an intermediate part thereof and an aperture for connection to said return passage;
a slider which slides gas-tightly in said guide passage with a first compartment for leading said control pressure and a second compartment for leading said high pressure remaining in both end parts of said guide passage and has a cut-off part thereon for making a narrow passage connecting said second compartment to said third orifice with a variable fluid friction between the slider and said guide passage and has an aperture thereon for opening said return port; and
a pressure control means for adjustably supplying said control pressure to said first compartment.

2. A variable capacity compressor in accordance with claim 1, wherein
said return passage connects to said return port through an inner space of said slider and said aperture of the guide passage.

3. A variable capacity compressor in accordance with claim 1, wherein
said guide passage is disposed between said return passage and said cylinder compartment.

4. A variable capacity compressor in accordance with claim 1, wherein
pressures in said first and second compartments is substantially equal to said suction pressure in maximum-capacity driving.

5. A variable capacity compressor comprising:
a rotor;
an enclosure containing said rotor rotatably therein and having a cylinder compartment wherein a volume sectioned by said rotor is changed cyclically by rotation of said rotor, a plurality of return ports formed on a wall of volume-decrease-step space in said cylinder compartment, an arc-shaped return passage which connects to said cylinder compartment through said return port, and exit formed on said wall of volume-increase step-space in said cylinder comparment for connecting said return passage with said cylinder compartment, and an arc-shaped guide passage which has a first orifice for leading control pressure on an end thereof, a second orifice for leading high pressure on the other end thereof, a third orifice for leading suction pressure on an intermediate part thereof and an aperture for connection to said return passage;

an arc-shaped slider which slides gas-tightly in the guide passage with a first compartment for leading said control pressure and a second compartment for leading said high pressure remaining in both end parts of said guide passage and has a cut-off part thereon for making a narrow passage connecting said second compartment to said third orifice with a variable fluid friction between the slider and said guide passage and has an aperture thereon for opening said return port; and a pressure control means for adjustably supplying said control pressure to said first compartment.

6. A variable capacity compressor in accordance with claim 5, wherein said return passage connects to said return port through an inner space of said slider and said aperture of the guide passage.

7. A variable capacity compressor in accordance with claim 5, wherein said guide passage is disposed between said return passage and said cylinder compartment.

8. A variable capacity compressor in accordance with claim 5, wherein pressures in said first and second compartments is substantially equal to said suction pressure in maximum-capacity driving.

9. A variable capacity compressor in accordance with claim 5, wherein said return port is gradually made smaller one by one in a rotating direction of said rotor.

* * * * *